United States Patent [19]

Menchetti

[11] Patent Number: 5,749,192
[45] Date of Patent: *May 12, 1998

[54] CORNER CLIPS FOR HORIZONAL FRAMING

[75] Inventor: Robert J. Menchetti, Buffalo, N.Y.

[73] Assignee: National Gypsum Company, Charlotte, N.C.

[*] Notice: The term of this patent shall not extend beyond the expiration date of Pat. No. 5,644,883.

[21] Appl. No.: 713,612

[22] Filed: Sep. 13, 1996

Related U.S. Application Data

[63] Continuation of Ser. No. 22,590, Feb. 25, 1993, abandoned.

[51] Int. Cl.⁶ .................................................. E04B 1/00
[52] U.S. Cl. .................. 52/489.1; 52/282.3; 52/288.1; 52/481.1; 52/731.7
[58] Field of Search ..................... 52/236.7, 236.9, 52/241, 242, 283.1, 287.1, 288.1, 282.1, 282.3, 290, 639, 731.7, 745.12, 729.3, 481.1, 489.1, 275, 278, 656.9, 658

[56] References Cited

U.S. PATENT DOCUMENTS

| | | |
|---|---|---|
| Re. 24,658 | 6/1959 | Hollister . |
| 585,111 | 6/1897 | Lehmann . |
| 600,392 | 3/1898 | Whitenack . |
| 619,968 | 2/1899 | Leonard . |
| 1,361,831 | 12/1920 | Crew . |
| 1,545,168 | 7/1925 | Schenck . |
| 1,598,129 | 8/1926 | Gersman . |
| 1,662,177 | 3/1928 | Williams . |
| 1,816,933 | 8/1931 | Robinson et al. . |
| 1,825,010 | 9/1931 | Murphy ............... 52/718.04 X |
| 2,027,882 | 1/1936 | Ross . |
| 2,042,290 | 5/1936 | Barrett . |
| 2,044,637 | 6/1936 | Ross ............... 52/489.1 X |
| 2,049,278 | 7/1936 | Toussaint et al. ............ 52/288.1 X |
| 2,065,493 | 12/1936 | Greulich . |
| 2,076,472 | 4/1937 | London . |
| 2,078,620 | 4/1937 | Venzie ............... 52/489.1 X |
| 2,092,210 | 9/1937 | Greulich . |
| 2,157,233 | 5/1939 | Geib, Jr. . |
| 2,271,472 | 1/1942 | Balduf . |
| 2,307,898 | 1/1943 | Olsen ........................ 72/118 |
| 2,316,668 | 4/1943 | Bronner . |
| 2,351,525 | 6/1944 | Leary ........................ 72/46 |
| 2,372,038 | 3/1945 | Westveer . |
| 2,495,862 | 1/1950 | Osborn . |
| 2,554,418 | 5/1951 | Mortenson . |
| 2,605,867 | 8/1952 | Goodwin . |
| 2,638,637 | 5/1953 | Kump, Jr. ............... 52/690 X |
| 2,663,181 | 12/1953 | Collman . |
| 2,752,013 | 6/1956 | Cole . |

(List continued on next page.)

FOREIGN PATENT DOCUMENTS

| | | |
|---|---|---|
| 121075 | 3/1946 | Australia . |
| 202688 | 3/1993 | China . |
| 393000 | 10/1990 | European Pat. Off. ......... 52/506.06 X |
| 1095143 | 3/1955 | France . |
| 1 432 551 | 2/1966 | France . |
| 51685 | 8/1889 | Germany . |
| 5112992 | 5/1993 | Japan ........................ 52/239 |
| 7329104 | 11/1984 | Taiwan . |
| 493129 | 12/1936 | United Kingdom . |

OTHER PUBLICATIONS

Copy of paper titled "Shaftwall/Stairwall Components". Part of a paper titled Gyproc Products and Systems and contains the date 1994.

*Primary Examiner*—Carl D. Friedman
*Assistant Examiner*—Winnie S. Yip
*Attorney, Agent, or Firm*—Marshall, O'Toole, Gerstein, Murray & Borun

[57] ABSTRACT

A hollow shaft wall corner with each of two walls having alternating horizontal studs and horizontally extending core boards, with the horizontal studs of the two respective walls adjoined at the wall corner by small clips affixed to the horizontal studs. A method of construction of the wall further includes small clips adjoining the ends of core boards at the wall corner.

12 Claims, 4 Drawing Sheets

U.S. PATENT DOCUMENTS

| | | |
|---|---|---|
| 2,976,971 | 3/1961 | Lundberg . |
| 3,013,644 | 12/1961 | Smith et al. ............................. 52/690 |
| 3,065,575 | 11/1962 | Ray . |
| 3,090,164 | 5/1963 | Nelsson . |
| 3,101,817 | 8/1963 | Radek . |
| 3,176,432 | 4/1965 | Doolittle, Jr. ........................... 50/186 |
| 3,225,503 | 12/1965 | Rallis . |
| 3,235,039 | 2/1966 | O'Donnell . |
| 3,242,627 | 3/1966 | Fountain ............................... 52/494 X |
| 3,251,164 | 5/1966 | Wright . |
| 3,266,209 | 8/1966 | Zibell . |
| 3,271,920 | 9/1966 | Downing, Jr. ....................... 52/481.1 X |
| 3,274,739 | 9/1966 | Gregoire ............................... 52/169 |
| 3,287,041 | 11/1966 | Cohen ................................. 52/658 X |
| 3,294,353 | 12/1966 | Rowe ............................. 52/717.06 X |
| 3,312,032 | 4/1967 | Ames . |
| 3,349,535 | 10/1967 | Balinski . |
| 3,362,056 | 1/1968 | Preller et al. . |
| 3,381,439 | 5/1968 | Thulin, Jr. . |
| 3,397,500 | 8/1968 | Watson, Jr. . |
| 3,418,776 | 12/1968 | Manderbach et al. . |
| 3,428,326 | 2/1969 | Clapsaddle . |
| 3,477,184 | 11/1969 | Johnson et al. ........................ 52/105 |
| 3,485,001 | 12/1969 | Miller . |
| 3,495,417 | 2/1970 | Ratliff, Jr. . |
| 3,508,364 | 4/1970 | Thompson . |
| 3,517,474 | 6/1970 | Lanthernier . |
| 3,603,054 | 9/1971 | Didry . |
| 3,651,610 | 3/1972 | Donahue ........................... 52/287.1 X |
| 3,702,044 | 11/1972 | Balinski . |
| 3,705,002 | 12/1972 | Varlonga . |
| 3,740,912 | 6/1973 | Sauer et al. . |
| 3,765,138 | 10/1973 | Bentle . |
| 3,839,839 | 10/1974 | Tillisch et al. . |
| 3,845,594 | 11/1974 | Butts et al. . |
| 3,845,601 | 11/1974 | Kostecky ........................... 52/690 X |
| 3,866,376 | 2/1975 | Nelsson . |
| 3,881,293 | 5/1975 | Conville ................................ 52/712 |
| 3,921,346 | 11/1975 | Sauer et al. . |
| 3,940,899 | 3/1976 | Balinski . |
| 3,950,900 | 4/1976 | Simpson . |
| 3,974,608 | 8/1976 | Grearson . |
| 4,002,261 | 1/1977 | Litchfield .............................. 220/80 |
| 4,011,704 | 3/1977 | O'Konski . |
| 4,024,691 | 5/1977 | Hansen et al. ....................... 52/656 X |
| 4,047,347 | 9/1977 | Scheid . |
| 4,047,354 | 9/1977 | Sutherland . |
| 4,047,355 | 9/1977 | Knorr . |
| 4,074,486 | 2/1978 | Grearson . |
| 4,109,440 | 8/1978 | Bill . |
| 4,125,984 | 11/1978 | Jonas . |
| 4,129,970 | 12/1978 | Whitney . |
| 4,147,379 | 4/1979 | Winslow . |
| 4,187,653 | 2/1980 | Kliewer, Jr. . |
| 4,201,020 | 5/1980 | Saunders . |
| 4,240,234 | 12/1980 | Eisinger et al. ........................ 52/261 |
| 4,251,973 | 2/1981 | Paik . |
| 4,353,192 | 10/1982 | Pearson et al. . |
| 4,364,212 | 12/1982 | Pearson et al. . |
| 4,435,936 | 3/1984 | Rutkowski . |
| 4,443,991 | 4/1984 | Mieyal ............................... 52/242 X |
| 4,587,783 | 5/1986 | McCoy et al. ......................... 52/282 |
| 4,597,278 | 7/1986 | Hamada et al. . |
| 4,640,076 | 2/1987 | Migliore . |
| 4,852,325 | 8/1989 | Dunn et al. . |
| 4,866,899 | 9/1989 | Houser . |
| 4,893,446 | 1/1990 | Gudmundsson et al. . |
| 4,897,976 | 2/1990 | Williams et al. . |
| 4,905,428 | 3/1990 | Sykes . |
| 4,909,006 | 3/1990 | Hickman et al. ..................... 52/288.1 |
| 4,914,880 | 4/1990 | Albertini . |
| 4,918,879 | 4/1990 | Bodurow et al. . |
| 4,969,304 | 11/1990 | Helderman . |
| 4,982,540 | 1/1991 | Thompson ............................ 52/287 |
| 5,065,559 | 11/1991 | Zegel et al. . |
| 5,090,174 | 2/1992 | Fragale ............................... 52/309.9 |
| 5,092,100 | 3/1992 | Lambert et al. ................. 52/489.1 X |
| 5,094,052 | 3/1992 | Gudmundsson et al. . |
| 5,129,628 | 7/1992 | Vesper . |
| 5,263,295 | 11/1993 | Laird et al. .......................... 52/489.1 |

CORNER CLIPS FOR HORIZONAL FRAMING

This is a CONTINUATION of U.S. application Ser. No. 08/022,590, filed Feb. 25, 1993 now abandoned.

This invention relates to a small metal clip for connecting horizontal studs at a vertical corner of a horizontal stud wall.

BACKGROUND OF THE INVENTION

A wall has been developed in which a plurality of horizontal metal studs and horizontally extending gypsum core boards are erected alternately one on top of another with vertical stability being provided by a vertical post having a vertically extending channel into which each of the horizontal studs and core boards extend. Generally, such horizontal stud walls will include a vertical corner post with channels opening in two perpendicular directions, whereby the horizontal studs and the core boards of two perpendicularly abutting walls are joined.

SUMMARY OF THE INVENTION

The present invention is directed to a lower cost horizontal stud wall, wherein vertical corner posts of the prior wall are omitted and in their place small sheet metal stud corner clips connect the ends of perpendicularly extending horizontal studs and optionally small core board corner clips connect the ends of perpendicularly extending core boards.

It is an object of the present invention to provide small, low cost corner clips as a replacement for full wall height corner posts in horizontal stud walls.

It is a further object to provide a lower cost horizontal stud wall.

It is a still further object to provide a novel method of erecting a horizontal stud wall.

BRIEF DESCRIPTION OF THE DRAWINGS

These and other objects and advantages will be more readily apparent when considered in relation to the preferred embodiments of the invention as set forth in the specification and shown in the drawings in which:

FIG. 7 is an isometric view of the core board corner of FIG. 1 affixed to two perpendicularly directed core boards.

DESCRIPTION OF THE PREFERRED EMBODIMENTS

Figure 1:
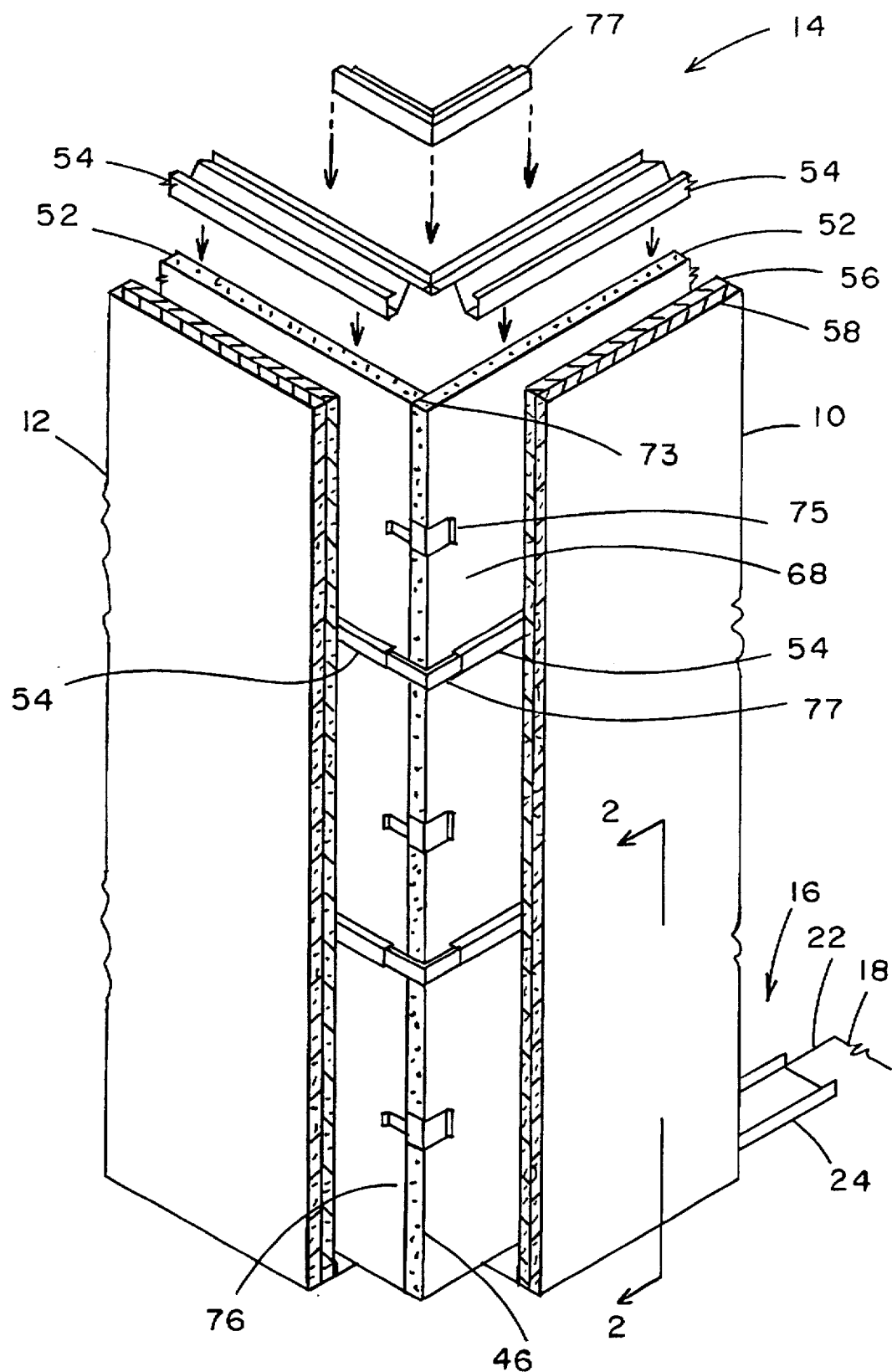
FIG. 1 is an isometric front view of a horizontal stud wall corner, partially constructed, with elements exploded upwards, and with outer wallboards cut away.
Figure 2:
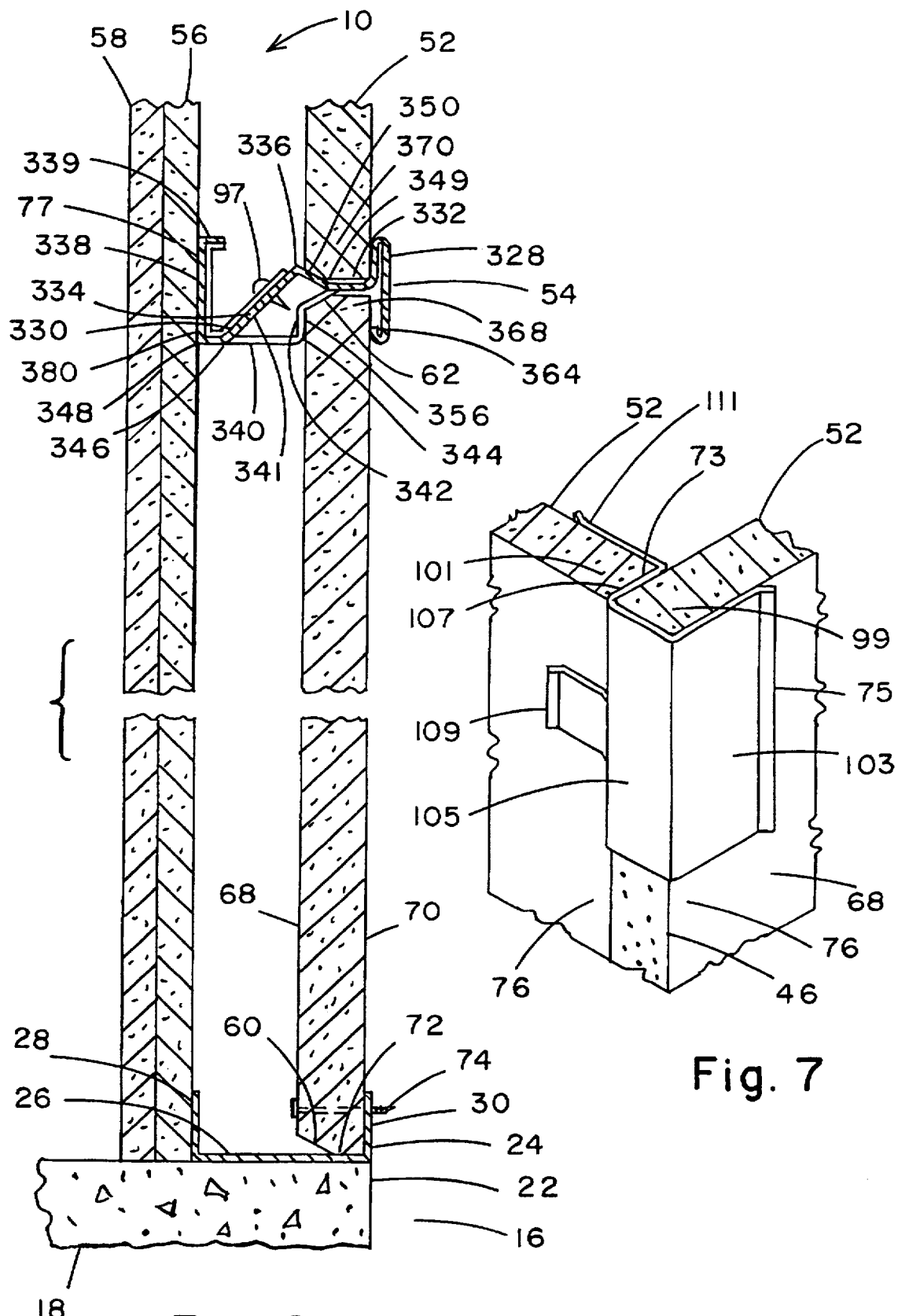
FIG. 2 is a vertical sectional view of a horizontal stud, core board, outer wallboard and a corner clip taken on line 2—2 of FIG. 1.
Figure 3:
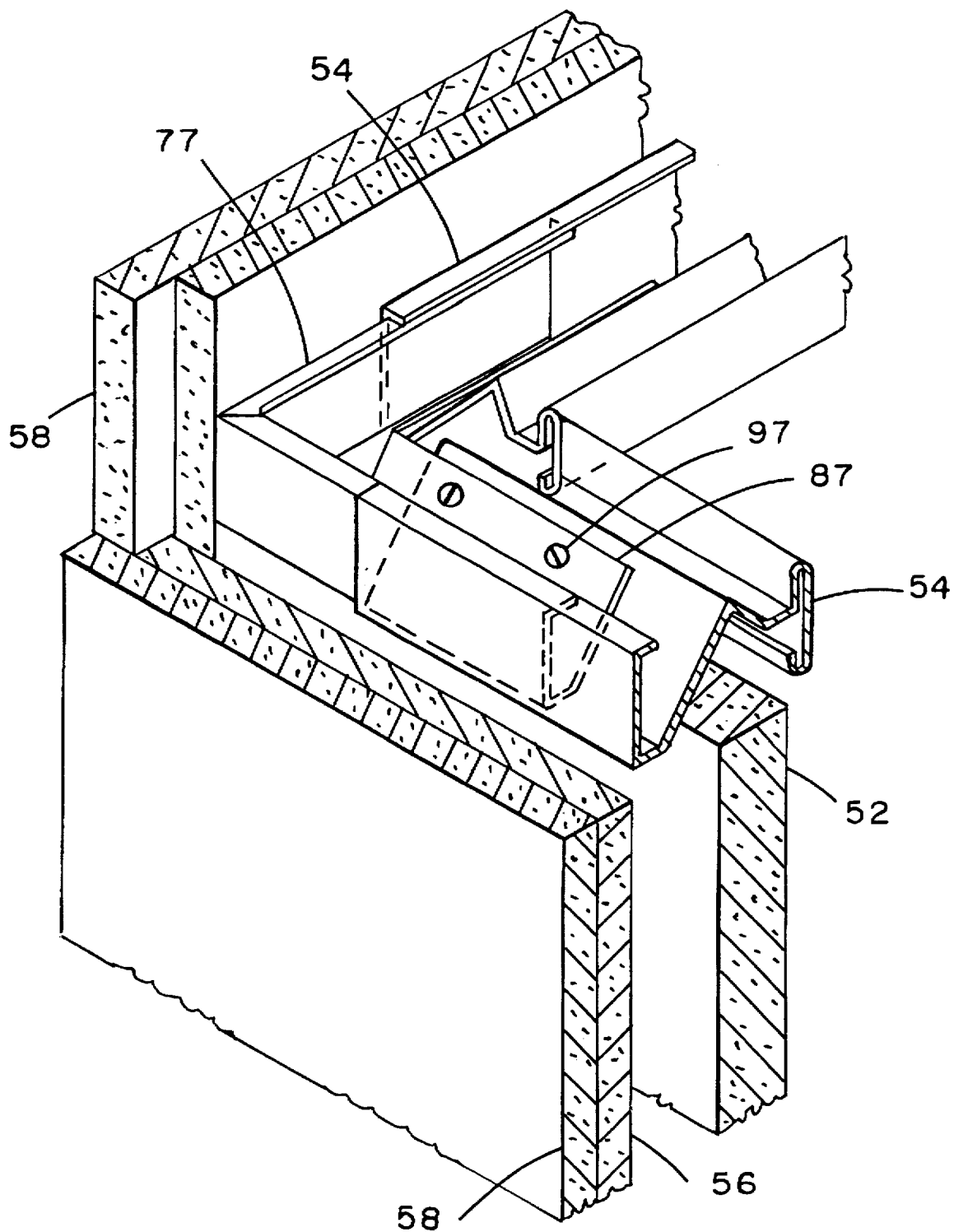
FIG. 3 is an enlarged isometric side view of the corner of FIG. 1, with outer wallboard cut away.

Referring to FIGS. 1–3, there is shown part of a side wall 10 and part of a front wall 12 of a hollow shaft wall structure 14 surrounding an elevator shaft 16. Elevator shaft 16 extends vertically through a plurality of floor-ceiling platforms, including the lower platform 18 and an upper platform (the next upper floor-ceiling slab, not shown). The shaft wall structure 14 extends vertically from the lower platform 18 to the upper platform along the edges 22 of these floor-ceiling platforms which surround and form the elevator shaft 16.

Side wall 10 consists of standard upwardly opening, channel-shaped floor track 24, having a horizontal web 26 and two vertical flanges 28, 30 and a similar downwardly opening ceiling track (not shown). Floor track 24 is mechanically affixed to the top of lower platform 18 and the ceiling track is mechanically affixed to the bottom of the upper platform (not shown), each adjacent the edges 22 of these floor-ceiling platforms.

At the corner 46 of side wall 10 and front wall 12, two floor tracks 24 and two ceiling tracks (not shown) meet to form a 90° corner.

FIGS. 1–3 show the arrangement of core boards 52, horizontal studs 54 and outwardly disposed gypsum wide wallboards 56, 58, which combine to form the side wall 10 and the front wall 12.

Typically the core boards 52 are paper-covered gypsum boards which are, in cross section, 2 feet by 1 inch, and will normally have a length equal to the extent of the wall 10, 12. The core boards have bevelled edges 60, 62 along the two long edges of each core board 52. Alternatively, non-bevelled board can be used. Preferably, the bevelled edges 60, 62 have a flat portion 72, of a width of about ⅝ inch, however, this could be varied considerably.

The first core board 52 to be installed in constructing wall 10 has a flat portion 72 resting on web 26 of floor track 24 and inner face 70 is held against inner flange 30 by a plurality of screws 74. The ends 76 of core boards 52 of the two respective walls 10, 12 meet at the corner 46, and the outer face 68 of one core board 52 overlaps the end edge 73 of the other core board 52.

The two core boards are held in place by novel, small core board corner clips 75, affixed on the ends 76 of the abutting core boards 52.

On top of the first core boards 52 to be installed in the walls 10, 12 are the first horizontal studs 54 to be installed, and progressively, in constructing walls 10, 12, additional core boards 52 and horizontal studs 54 alternatively are put into place.

The horizontal studs 54 all extend to very closely adjacent the corner 46, and horizontal studs 54 at each respective level of walls 10, 12 are rigidly connected, one to the other, by novel stud corner clips 77.

The horizontal studs 54 in the preferred embodiment, are an elongate roll-formed sheet of metal with a cross section which includes an inner flange 328, a web 330 extending perpendicularly outwardly from the middle of inner flange 328 about ⅝ inch, forming a flat portion 332, whereat a major portion 334 of web 330 extends upwardly and outwardly about ⅝ inch to bend 336 and thence downwardly and outwardly to an upwardly extending outer flange 338. Outer flange 338 extends upwardly to an inwardly directed lip 339. A minor portion 340 of web 330, about a 3-inch length of each foot of web, extends downwardly and outwardly about ⅝ inch to bend 342, thence downwardly to bend 344 and thence outwardly to upwardly extending outer flange 338. Slits 346 were cut crosswise of web 330, during forming of horizontal stud 54, from the flat portion 332 to the outer flange 338. The slits 346 are preferably angled slightly to form minor portions 340 which have a shorter dimension along the outer flange bend 348 than along the bend 349, whereat the minor portion 340 is adjoined the flat portion 332.

Horizontal stud 54 is mounted atop an upper edge portion 368 of one of the two core boards 52, and a lower edge portion 370 of the other core board 52 is disposed atop stud 54.

The upper edge portion 368 is held firmly between board holding portion 356 of web minor portion 340 and the hem 364 of inner flange 328.

The lower edge portion 370 of the other core board 52 is held between the ramp portion 350 and inner flange 328.

Gypsum wide wallboard 56, 58 is screw attached against the outer surfaces 380 of the outer flanges 338, and to the stud corner clips 77.

Figure 4:
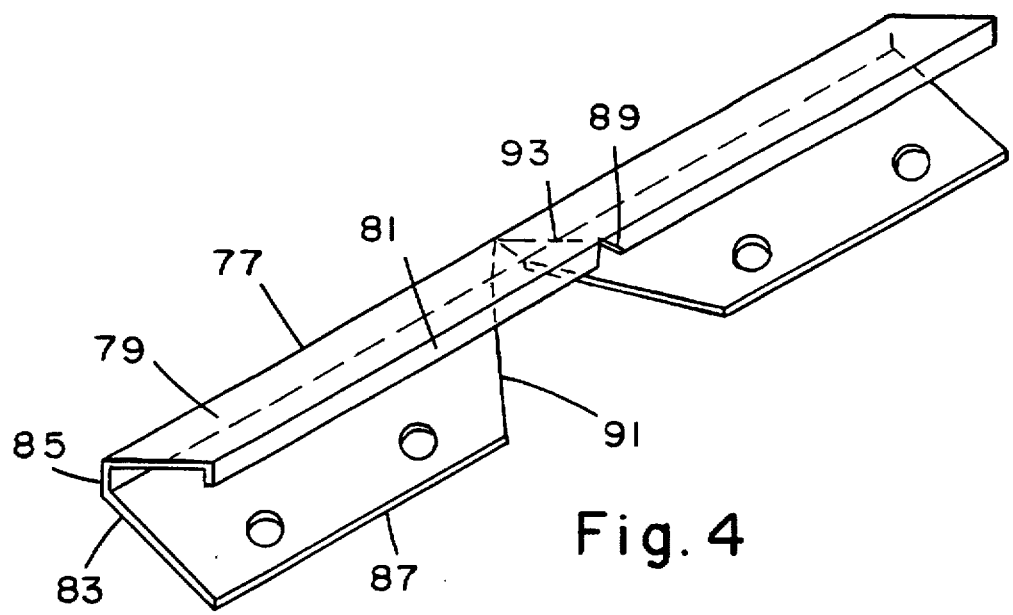
FIGS. 4 and 5 are isometric views of the stud corner clip of FIG. 1 prior to the final forming and as finally formed.
Figure 5:
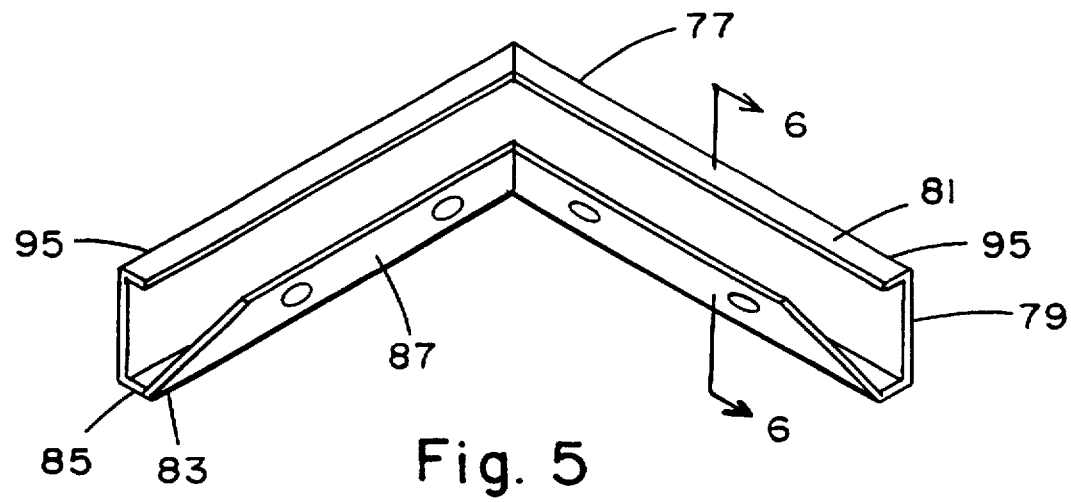
Figure 6:
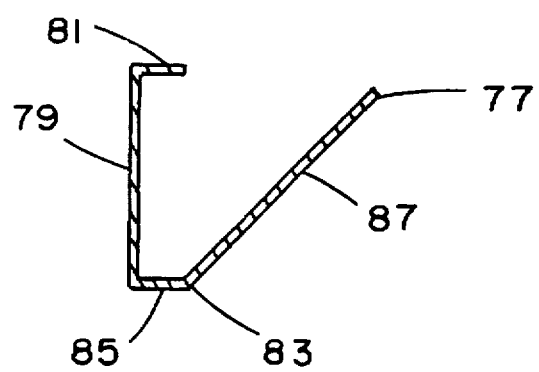
FIG. 6 is an end sectional view of the finally formed clip of FIG. 5, taken on line 6—6.

In the preferred embodiment, stud corner clips 77 are formed from a single piece of sheet metal. FIGS. 4–6, having central web portion 79, an inwardly turned, narrow, top flange 81 and an inwardly turned, bottom flange 83. Bottom flange 83 includes a narrow, bottom portion 85 and an inwardly and upwardly directed, wide-angled portion 87. In order to form the stud corner clip 77, the top flange 81 and the bottom flange 83 are notched to form a 90° V-notch 89 in the top flange and a 90° V-notch 91 in the bottom flange. Notches 89 and 91 permit the web portion 79 to be bent 90° at fold 93, creating two perpendicular segments 95 forming the finished stud corner clip 77, with the notches completely closed. The top flange 81 and bottom flange 83 of the finished stud corner clip 77 become continuous around the fold 93 and may be welded where the notches 89 and 91 severed the flanges, if a more rigid stud corner clip 77 is desired.

The cross section of the stud corner clip 77 is identical to, but slightly smaller than, the cross section of the horizontal stud outer flange 338, lip 339 and the adjacent downwardly and outwardly portion 341 of the web major portion 334, whereby the two stud corner clip segments 95 can each be engaged firmly within the confines of the outer flange 338, lip 339 and portion 341. Stud corner clip 77 is also screw affixed to horizontal stud 54 by screws 97.

Core board corner clips 75 aid in the construction of shaft wall structure by holding abutting core boards 52 together at the corner 46 while horizontal studs are being placed thereon and being adjoined by a stud corner clip 77. With the preferred form of horizontal stud 54, core boards 52 will generally stay in place without core board corner clips 75 until upper horizontal studs 54 and corner clips 75 are mounted thereon, however, core board corner clips 75 do contribute to ease of erection and stability of the completed shaft wall structure 14. Core board corner clips 75 are formed of a single piece of sheet metal bent to form a pair of perpendicular directed channels 99, 101. Channels 99, 101 are formed by the shape of core board corner clip 75, which includes a first flange 103, a bottom wall 105 and a central wall 107 forming channel 99. Central wall 107 has a small lip 109, which is cut and bent out of central wall 107. A second flange 111 extends perpendicularly from the end of central wall 107, parallel to lip 109, which together form channel 101, perpendicular to channel 99. The perpendicularly extending core boards 52 have ends 76 extending respectively into channels 99, 101.

Having completed a detailed disclosure of the preferred embodiments of my invention, so that those skilled in the art may practice the same, I contemplate that variations may be made without departing from the essence of the invention.

I claim:

1. A horizontal stud wall corner structure comprising two vertical walls abutting one another at an angle and forming thereat a vertical wall corner, each said wall comprising a plurality of horizontal metal studs and a plurality of rigid, horizontally extending core boards disposed between said studs whereby said wall has alternating horizontal studs and horizontally extending core boards, said horizontal studs of each of said walls being at substantially the same vertical height as said horizontal studs of the other of said walls, said two walls being adjoined at said corner by a plurality of stud corner clips, each said stud corner clip having two segments extending at an angle, one to the other, equal to said angle between said walls, each of said studs comprising an inner flange, an outer flange and a web joining said inner and outer flanges, said outer flange and a portion of said web being bent to a cross-sectional shape including a confined space, said segments being each respectively affixed to one of said horizontal studs by extending into said confined space and thereby interconnecting with said stud.

2. The wall corner structure of claim 1, wherein said stud corner clip segments have a cross-sectional shape similar to a portion of said cross-sectional shape of said horizontal stud, whereby said corner clips interfit with said horizontal studs.

3. The wall corner structure of claim 2, wherein said cross-sectional shape of said corner clip interlocks with said horizontal stud cross-sectional shape.

4. The wall corner structure of claim 1, wherein said wall is a hollow shaft wall for enclosing an elevator shaft.

5. The wall structure of claim 1, wherein said horizontally extending core boards have bottom and top edges engaging said webs of said horizontal studs.

6. The wall structure of claim 5, wherein said outer flanges have an outer side, and further including wallboards affixed against said outer side of said outer flanges in spaced parallel relation to said core boards.

7. A horizontal stud wall corner structure comprising two vertical walls abutting one another at an angle and forming thereat a vertical wall corner, each said wall comprising a plurality of horizontal metal studs and a plurality of rigid, horizontally extending core boards disposed between said studs whereby said wall has alternating horizontal studs and horizontally extending core boards, said horizontal studs of each of said walls being at substantially the same vertical height as said horizontal studs of the other of said walls, said two walls being adjoined at said corner by a plurality of stud corner clips, each said stud corner clip having two segments extending at an angle, one to the other, equal to said angle between said walls, said segments being each respectively affixed to one of said horizontal studs, said stud corner clips being formed of a single piece of sheet metal formed to a cross section compatible with engaging said horizontal stud and folded along a fold line to an angle equal to the angle between said two vertical walls.

8. The wall corner structure of claim 7, wherein a portion of said single piece of sheet metal has had a V-notch cut out of it adjacent said fold line.

9. A combination of a sheet metal corner clip and two metal studs for use in a corner structure between two walls, each of said studs comprising a web and at least one flange which form a confined space in cross section, said clip comprising a flat web extending in a plane, said web having first and second sides and an imaginary fold line, said fold line extending between and perpendicularly of said first and second sides, a first flange integrally formed on said first side of said web, said first flange extending in a first direction from said web and at a first angle with said plane, a second flange integrally formed on said second side of said web, said second flange extending in said first direction and at a second angle with said plane, and each of said first and second flanges having a 90° V-notch formed therein, each of said V-notches extending to said fold line of said web, whereby said web is foldable at said fold line and said notches close to form two segments which extend substantially perpendicularly one to the other, said clip extending into said confined space of each of said two studs and thereby interconnecting said two studs.

10. The combination in claim 9, wherein said first angle of said first flange is 90°.

11. The combination in claim 9, wherein said second flange includes a first portion extending at said second angle, and said second angle forms an acute angle with said plane.

12. The combination in claim 11, wherein said second flange further includes a second portion between said web and said first portion, said second portion extending substantially perpendicular to said plane.

* * * * *